United States Patent [19]

Therkildsen

[11] 3,848,852

[45] Nov. 19, 1974

[54] WINCH DRUM DISCONNECT CLUTCH

[75] Inventor: Henry T. Therkildsen, East Peoria, Ill.

[73] Assignee: Caterpillar Tractor Co., Peoria, Ill.

[22] Filed: May 29, 1973

[21] Appl. No.: 364,902

[52] U.S. Cl............ 254/187 R, 192/21, 192/91 A, 192/96, 254/150 R
[51] Int. Cl.............................................. B66d 1/24
[58] Field of Search............ 254/187 R, 166, 186 R, 254/150 R; 192/91 A, 48.5, 21, 51, 85 A, 96

[56] References Cited
UNITED STATES PATENTS

| | | | |
|---|---|---|---|
| 2,881,882 | 4/1959 | Gentile | 254/187 R |
| 3,027,141 | 3/1962 | Ellis | 254/166 |
| 3,325,149 | 6/1967 | Woodward | 254/187 R |
| 3,362,687 | 1/1968 | Hensley | 254/187 R |
| 3,550,735 | 12/1970 | Olsen | 254/187 R |
| 3,697,049 | 10/1972 | Wallace | 192/91 A |
| 3,729,171 | 4/1973 | Yates et al | 192/12 A |

*Primary Examiner*—Richard A. Schacher
*Assistant Examiner*—Jeffrey V. Nase
*Attorney, Agent, or Firm*—Phillips, Moore, Weissenberger, Lempio & Strabala

[57] ABSTRACT

A winch assembly having a power input means coupled to an elongated shaft by a plurality of clutches which are selectively operable to control rotation of the shaft, a disconnect clutch providing a selective coupling between the shaft and a cable drum, the disconnect clutch including one jaw gear rotatably mounted upon the shaft and operatively coupled in driving relation with the cable drum, a second jaw gear mounted in splined relation upon the shaft for axial movement thereon. A hydraulically responsive piston is axially arranged within the shaft and coupled with the second clutch gear to control engagement and disengagement between the two clutch gears.

2 Claims, 4 Drawing Figures

WINCH DRUM DISCONNECT CLUTCH

BACKGROUND OF THE INVENTION

The present invention relates to a winch assembly of the type including a plurality of clutches within an intermediate power train for selectively regulating operation of a winch drum. The present invention is more particularly directed toward a winch drum disconnect clutch providing a selective coupling between the power train and the cable drum to facilitate "free-wheeling" of the cable drum.

A variety of power trains is available in the prior art for operating such cable drums. One such arrangement, as described in greater detail below, includes a pair of opposed clutches which are selectively operable to rotate the cable drum in opposite directions and provide for reeling-in and reeling-out operation of the winch assembly. Other power train arrangements are also contemplated within the scope of the present invention. For example, another power train arrangement operable within the scope of the present invention might include a single clutch providing for reeling-in rotation of the cable drum and another normally engaged clutch which may be selectively engaged to resist rotation of the cable drum in an opposite direction under the influence of external forces during reeling-out operation.

A specific object of the present invention is to provide a simple and effective disconnect clutch for selectively engaging or disengaging a power train from the cable drum in order to facilitate free wheeling operation of the winch assembly.

SUMMARY OF THE INVENTION

To fulfill the above object, the present invention contemplates a winch assembly having a power input coupled with an elongated shaft by means of a power train including a plurality of selectively operable clutches, the shaft being coupled with a cable drum by means of a disconnect clutch comprising a pair of jaw gears supported upon the shaft with a hydraulically responsive piston means being axially arranged within the shaft and operatively coupled with the jaw gears to control engagement and disengagement of the disconnect clutch.

Additional objects and advantages of the invention are made apparent in the following description having reference to the accompanying drawings.

DESCRIPTION OF A PREFERRED EMBODIMENT

Figure 1:
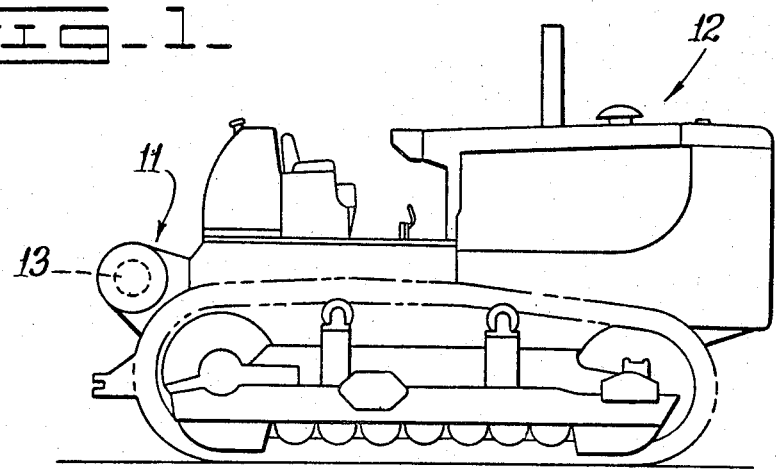
FIG. 1 is a side elevation view of a track-type tractor including a towing winch assembly constructed according to the present invention.

Referring to the drawings and particularly to FIG. 1, a towing winch assembly 11 constructed according to the present invention is mounted upon a track-type tractor 12 and includes a rotatable cable drum 13. The cable drum is operated by a power train for the winch assembly as described in greater detail below to provide for generally conventional reeling-in and reeling-out operation of a cable (not shown).

Figure 2:
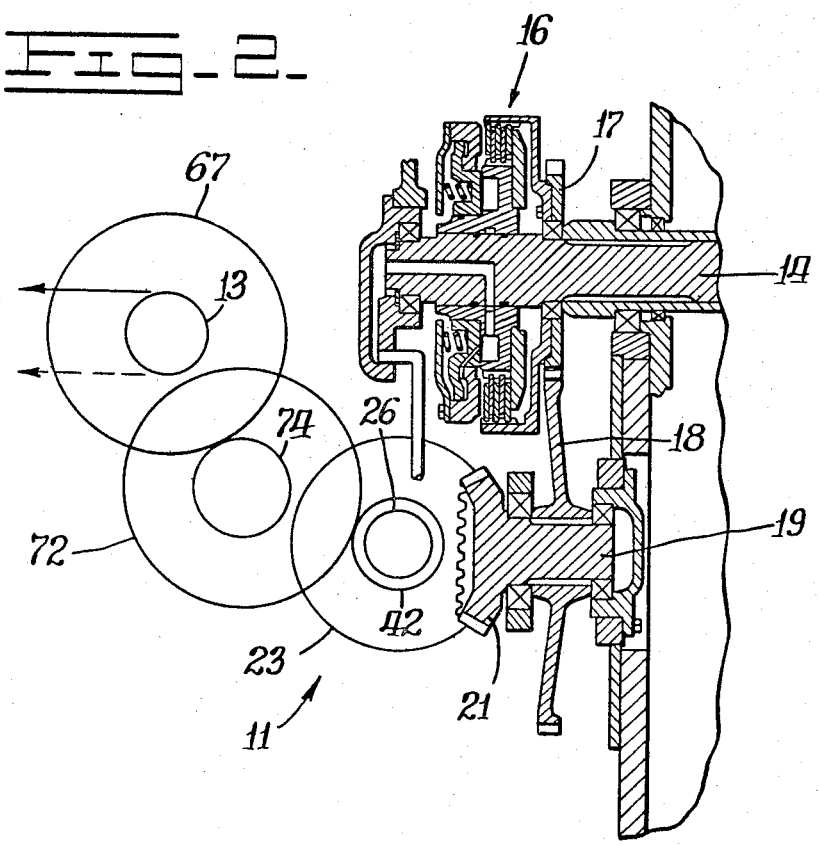
FIGS. 2 and 3 are sectioned views illustrating in greater detail the power train of the winch assembly.
Figure 3:
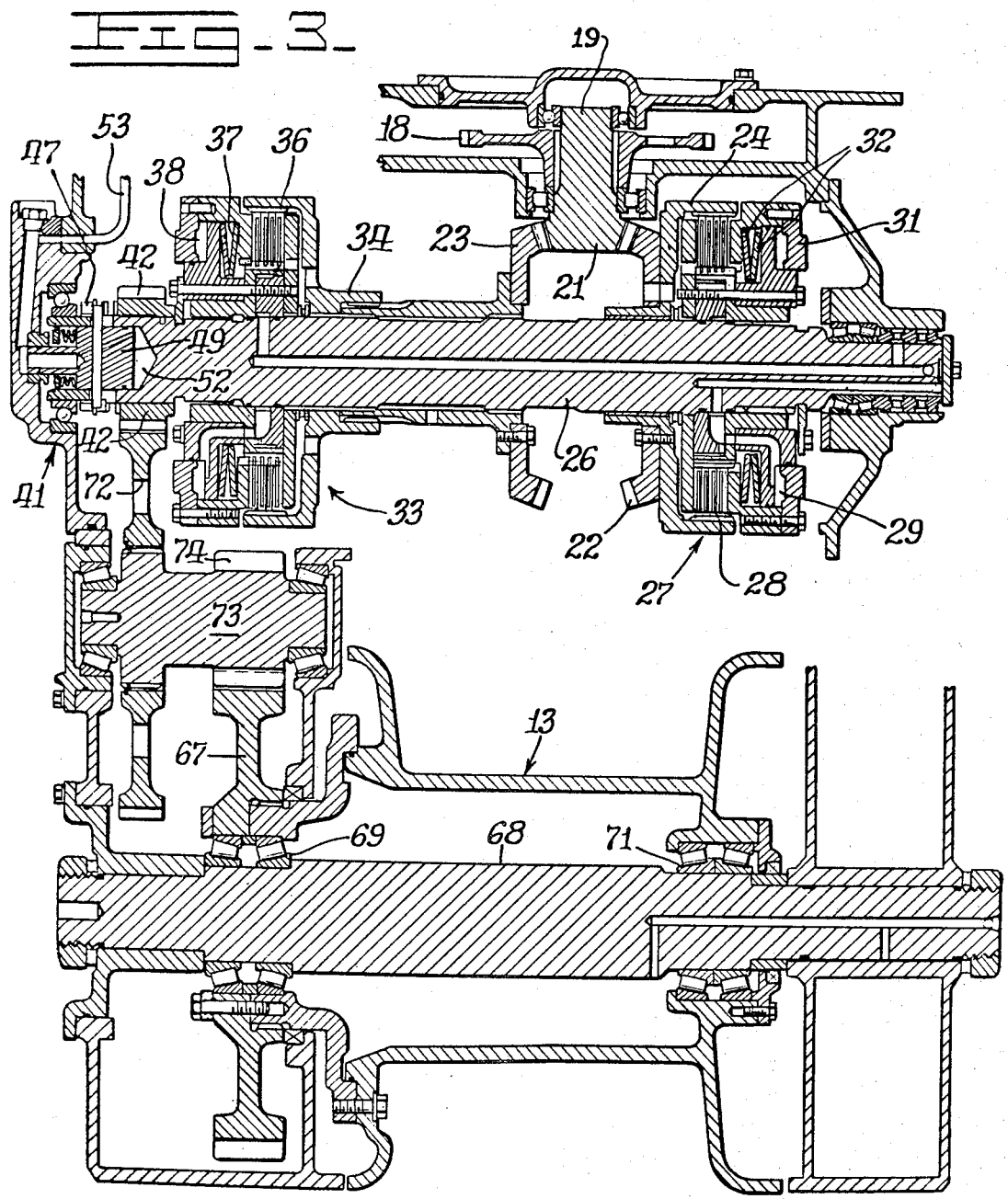

The power train for the winch assembly is best illustrated in FIGS. 2 and 3. Referring now to those figures, a power input means or shaft 14 for the winch assembly may comprise a conventional power take-off for a prime mover or internal combustion engine (not shown) of the tractor 12 of FIG. 1.

A normally disengaged input clutch 16 is actuated to selectively couple the input shaft 14 with a gear 17. The gear 17 meshes with a gear 18 which in turn is splined to a rotatable input shaft 19. One end of the input shaft 19 is secured to a first bevel gear 21 which meshes with opposed second and third bevel gears 22 and 23. The bevel gear 22 is secured to a carrier 24 which is rotatably mounted on an elongated shaft 26. The carrier and shaft are adapted to be coupled together by a normally engaged winch clutch 27 comprising interleaved friction discs 28 which are alternately mounted for axial movement on the carrier and shaft by means of conventional splined connections. The friction discs are disengaged by fluid pressure in a clutch chamber 29 acting upon an annular piston assembly 31 to move the piston assembly rightwardly as viewed, for example, in FIG. 3. The discs are normally compressed together to engage the clutch by means of Belleville-type spring plates 32 arranged in back-to-back relation.

The bevel gear 23 is similarly coupled with a second winch clutch 33 which comprises a carrier 34, rotatably mounted on the common shaft 26 and coupled to the gear 23, and interleaved clutch discs 36 which are alternately splined for axial movement on the carrier and shaft. Belleville-type spring plates 37 normally engage the clutch while fluid pressure in an actuating chamber 38 tends to disengage the clutch by moving the piston assembly leftwardly as viewed, for example, in FIG. 3. When both of the clutches 27 and 33 are engaged by spring force, the shaft 26 is locked against rotation.

Figure 4:
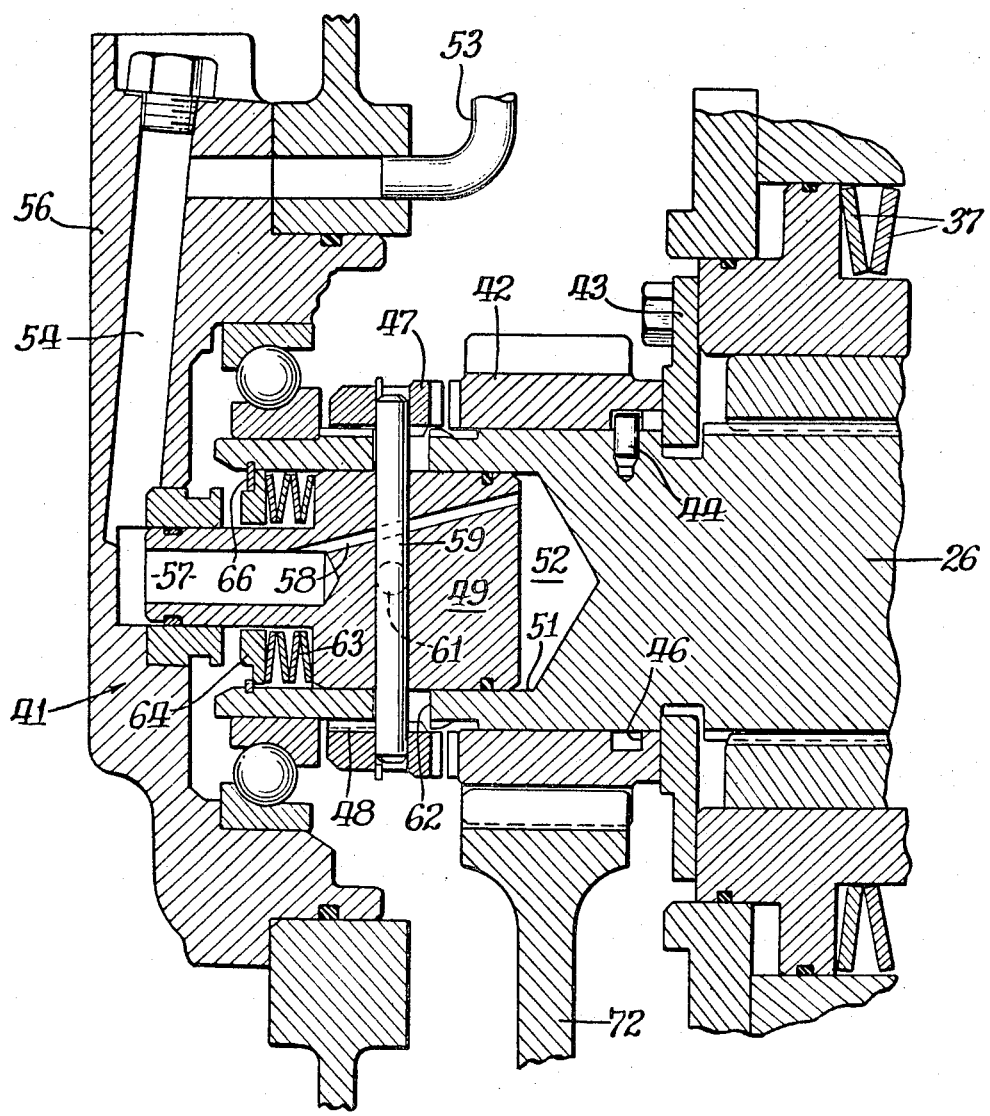
FIG. 4 is an enlarged fragmentary view with parts in section to particularly illustrate a disconnect clutch arranged within the power train according to the present invention.

According to the present invention, the elongated shaft 26 is operatively coupled with the cable drum 13 by a disconnect clutch indicated at 41. The clutch 41, which is described in greater detail below, is normally engaged so that the cable drum 13 is coupled for rotation with the shaft 26. Thus, when only the second winch clutch 33 is disengaged, the bevel gear 22 rotates the carrier 24 and thus the shaft 26 in a first direction of rotation. Conversely, when only the first winch clutch 27 is disengaged, the bevel gear 23 imparts rotation to the carrier 34 and the shaft 26 in the opposite direction of rotation. Thus, the clutches 27 and 33 tend to provide for powered operation of the shaft 26 and the cable drum 13 in either "reeling-in" or "reeling-out" modes of operation. The clutch 41 may thus be selectively disengaged to permit free wheeling rotation of the cable drum 13 free from "drag" which might otherwise be caused by the shaft 26 and other components associated for rotation therewith. The clutch 41 is described in greater detail immediately below, having particular reference to FIG. 4.

The disconnect clutch 41 includes a first clutch member or jaw gear 42 which is arranged for rotation upon the shaft 26. The jaw gear 42 is fixed against axial movement relative to the shaft 26 by a thrust plate 43 and a pin 44 extending from the shaft 26 into an annular groove 46 formed in the jaw gear 42.

A second clutch member or jaw gear 47 is coupled for rotation with the shaft 26 by means of splines indicated at 48. The splined mounting of the jaw gear 47 permits it to move into and out of meshing engagement with the first clutch member or jaw gear 42 under the influence of a piston 49 which is axially arranged within an internal bore 51 in the shaft 26. An actuating chamber 52 is thus formed in the right end of the bore 51 by the piston 49. Hydraulic fluid for actuating the piston 49 is introduced into the chamber 52 by means of passages 53 and 54 formed in a housing portion 56 of the winch assembly. The passage 54 is in communication with the chamber 52 by means of passages 57 and 58 formed in the piston 49 itself.

The piston 49 is secured to the second jaw gear 47 by means of pins 59 and 61 which extend through axially elongated slots 62 in the shaft 26. Thus, fluid pressure in the chamber 52 tends to move the piston 49 and the jaw gear 47 in a leftward direction as viewed in FIG. 4. Leftward movement of the piston 49 causes compression of Belleville-type springs 63 which are retained in place by means of a plate 64 and retaining ring 66. Thus, when fluid pressure is relieved from the chamber 52, the springs 63 are effective to again urge the piston 49 in a rightward direction so that the jaw gear 47 is again engaged with the other jaw gear 42.

The first clutch member of jaw gear 42 may be coupled either directly or indirectly to the cable drum 13. In the present embodiment, the cable drum 13 is secured to a gear 67 and mounted for rotation upon a shaft 68 by means of bearings 69 and 71. The clutch gear 42 meshes with a gear 72 mounted upon an intermediate shaft 73 along with another gear 74 which meshes with the gear 67.

Controls for operating the opposed clutches 27 and 33 as well as the disconnect clutch 41 are not a feature of the present invention and have been omitted from the drawings for the purpose of clarity. However, as noted above, the clutches 27 and 33 may be actuated independently or together in the same manner and by similar means disclosed, for example, in U.S. Pat. application Ser. No. 151,367 now U.S. Pat. No. 3,729,171 entitled "Reversible Towing Winch and Method for Operating Same," filed on June 9, 1971 by Lyle F. Yates, et al. and assigned to the Assignee of the present invention. As disclosed in that application, hydraulic actuation of one of the clutches 27 and 33 provides for reeling-in operation while actuation of the clutch provides for reeling-out operation and simultaneous actuation of the two clutches provides for free wheeling operation. The clutch 41 could, of course, be actuated by a similar valve arrangement or by means of an electric solenoid and auxiliary disconnect switch (neither shown) which would be actuatable in the free wheeling mode of operation to pressurize the chamber 52 and thus uncouple the jaw gear 47 from the jaw gear 42. It is further noted in regard to operation of the disconnect clutch 41 that engagement and disengagement between the two jaw gears 42 and 47 is contemplated only when those components are not in relative rotation.

What is claimed is:

1. A winch of the type having a rotatable cable drum and comprising a power input means, a rotatable, elongated drive shaft, clutch means providing a selective coupling between the power input means and the elongated drive shaft, a first clutch member rotatably mounted upon the drive shaft and operatively coupled in driving relation with the rotatable cable drum, a second clutch member secured for rotation with the shaft and axially movable thereon, the first and second clutch members having facing jaw-type gear faces suitable for meshing engagement with each other, and hydraulically responsive piston means axially arranged within the elongated drive shaft and coupled with the second clutch member to control engagement and disengagement between the first and second clutch members, the power input means comprising a power input shaft supporting a first bevel gear, second and third bevel gears arranged in meshing relation with the first bevel gear and in opposition to each other, the clutch means comprising respective clutches for selectively coupling each of the second and third bevel gears with the elongated drive shaft, each of the respective clutches being mounted upon the elongated drive shaft.

2. The winch of claim 1 wherein the two clutches associated with the second and third bevel gears are friction type clutches.

* * * * *